United States Patent [19]
Melchior

[11] 3,836,243
[45] Sept. 17, 1974

[54] LIQUID CRYSTAL DISPLAY APPARATUS
[75] Inventor: Hans Melchior, Basking Ridge, N.J.
[73] Assignee: Bell Telephone Laboratories, Incorporated, Murray Hill, N.J.
[22] Filed: June 27, 1972
[21] Appl. No.: 266,586

[52] U.S. Cl............................ 353/122, 350/160 LC
[51] Int. Cl...................... G03b 21/00, G03b 21/60
[58] Field of Search...................... 350/160 LC, 117

[56] References Cited
UNITED STATES PATENTS
3,650,608  3/1972  Baker................................. 350/117
3,663,086  5/1972  Assouline..................... 350/160 LC OTHER PUBLICATIONS
IBM Tech. Disclosure, Vol. 15, No. 6, November 1972; Powers, "Thermally Activated Liquid Crystal Display,".

Primary Examiner—Louis R. Prince
Assistant Examiner—A. J. Mirabito
Attorney, Agent, or Firm—R. A. Ryan

[57] ABSTRACT

A system in accordance with the present invention utilizes a thermally addressed liquid crystal display cell as an imaging device in, for example, a schlieren optics projection arrangement. In preferred embodiment, the display cell includes a layer of liquid crystal substance, sandwiched between a first optically transparent heat-producing electrode, a second electrode, and transparent support substrates. The electrodes and the liquid crystal layer are supported by and contained between the support substrates. A controlled laser beam selectively generates hot spots in the heat-producing electrode which, in turn, locally heat the liquid crystal substance above its transition temperature. When the liquid crystal substance is subsequently cooled to its mesophase, long-lasting light-scattering centers remain. These long-lasting light-scattering centers are erased by applying a relatively high-frequency a-c voltage to the electrodes.

18 Claims, 8 Drawing Figures

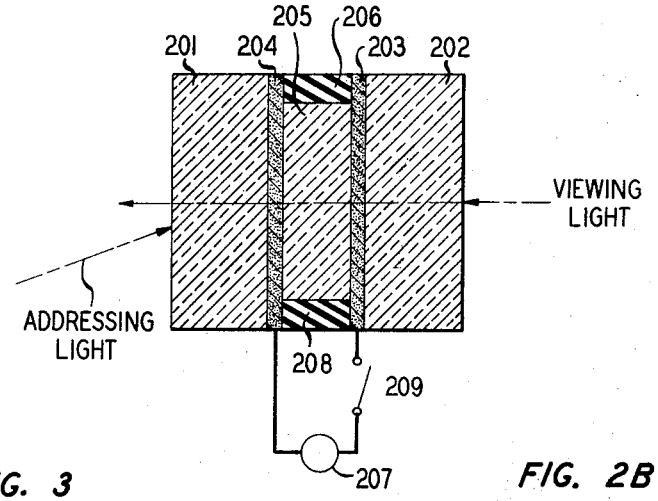
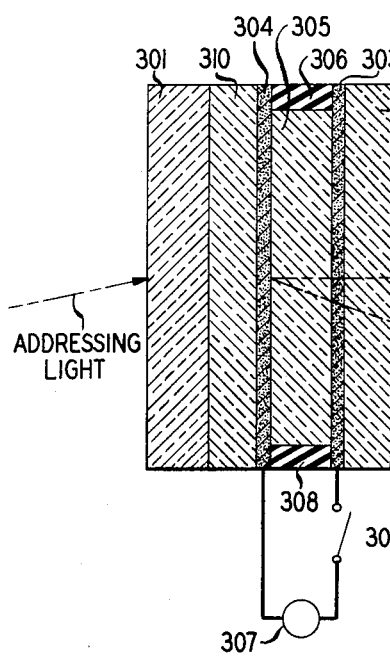
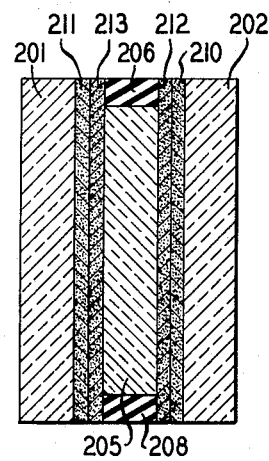
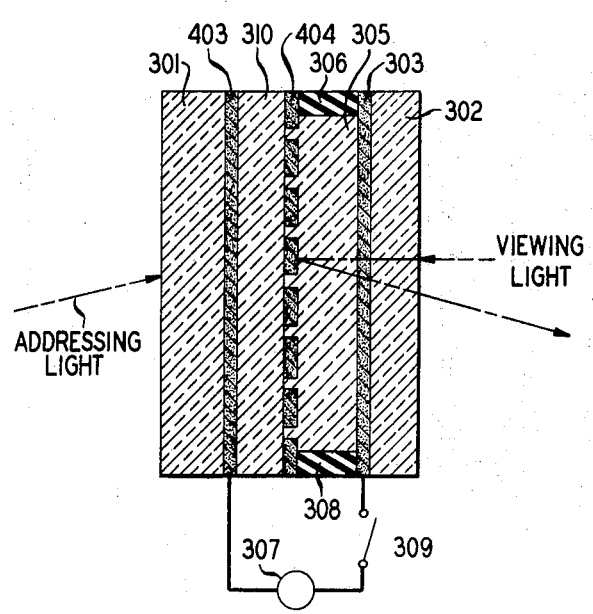

LIQUID CRYSTAL DISPLAY APPARATUS

RELATED APPLICATIONS

This application is related to an application by F. J. Kahn, Ser. No. 266,587 filed of even date herewith and assigned to the assignee of the present application. The claims in the instant application are directed to display apparatus whereas the claims in said F. J. Kahn application are directed to liquid crystal display cells.

BACKGROUND OF THE INVENTION

1. Field of the Invention

The present invention relates to liquid crystal display systems and to liquid crystal display cells for use in such systems.

2. General Description

The existence of materials, broadly classified as liquid crystals, was observed about 100 years ago. Interest in liquid crystals had, however, been limited almost exclusively to the laboratory until recently when there arose a renewed interest in liquid crystals and their use in a variety of commercial applications. As a result of this extended interest in liquid crystals there is a significant body of literature relating to their theory and properties. The following references are representative of that knowledge and are recommended to those desiring to become more familiar with the theory and operation of liquid crystals: Molecular Structure and the Properties of Liquid Crystals by G. W. Gray, Academic Press, N.Y. 1962; "Liquid Crystals: Perspectives, Prospects and Products" by Edwin Stepke appearing in Electro-Optical Systems Design, February 1972, pages 20–31, "Liquid Crystals and Their Applications" by J. L. Fergason et al, appearing in Electro Technology, January 1970, pages 41–50; Liquid Crystals and Their Applications, edited by Thomas Kallard, Optosonic Press 1970. It is noted that the last-mentioned reference includes an extensive bibliography which will provide additional useful reference material.

The following brief discussion of the background of the invention, then, is not intended to be an in-depth tutorial on liquid crystals, but rather is intended to merely refresh the memory of a reader as to some very general concepts.

In general, then, a liquid crystalline material (commonly referred to as a liquid crystal) is a material which includes a liquid crystalline phase. That is, in a particular temperature range within the liquid phase, the molecules of the substance have a long-range orientational order. At temperatures below the mentioned temperature range, the substance behaves as a solid and at temperatures above this range, the substance behaves as an ordinary isotropic liquid. Within the temperature range defining the liquid crystalline phase (mesophase), however, the liquid crystal substance exhibits a number of interesting and useful properties.

To better understand these properties, it is common to consider that there are three orientational orders which the molecules of the liquid crystalline substances can assume in the liquid crystalline phase or state, viz., the nematic, smectic, and cholesteric orders. To illustrate, if the (typical) cigar-shaped molecules of a liquid crystal substance are aligned such that their long axes are parallel to each other but the molecules are free to move in a direction parallel or perpendicular to the long axes, the liquid crystal molecules are said to have an orientational order defining the nematic phase. Different constraints on the molecules, well known to practitioners in the art, which distinguish the liquid crystal phase from the isotropic liquid phase, define the cholesteric and smectic phases.

Interestingly, a number of liquid crystal substances exhibit the characteristics of more than one phase within the range defining the liquid crystal phase. For example, a substance might have the characteristics of a smectic liquid crystal over a part of the temperature range of the liquid crystal phase and the characteristics of a cholesteric for the remainder of the temperature range defining the liquid crystalline phase.

It is a further characteristic of liquid crystal substances in their liquid crystalline states that they exhibit distinct textures. The textures which a liquid crystalline substance assumes depends on the composition of the material, and the temperature and pressure to which the material is subjected. These different textures, in addition, depend on the past history of the substance, the boundary conditions imposed on the substance and various other conditions.

Most notably, substances having a texture characterized by a uniform molecular order over dimensions large compared to the wavelength of the viewing light exhibit little or no light scattering. Thus, in the absence of external stimuli, uniformly ordered liquid crystals in the mesophases show little or no scattering of light.

Alternatively, however, liquid crystal materials in the liquid crystalline phase, can be altered by various means to create a texture which will result in the strong scattering of light. In general, it is this ability to controllably impose and remove these light-scattering textures which are of particular interest in the instant invention.

It is a feature of liquid crystal substances that the polarization of light transmitted through those substances can be altered by the application of external stimuli such as electric fields.

Both the scattering effects and the polarization effects introduced into liquid crystals are readily made visible by use of various optical arrangements (such as standard projection techniques) well known to persons well practiced in the art.

It is emphasized that the properties and characteristics of the liquid crystalline substances described herein are those exhibited by thin layers or coatings of liquid crystal substances.

It is further considered helpful at this point to mention that it is well known to the practitioner in the art to establish a locally (or globally) ordered condition of the molecules in a number of liquid crystal substances, as by applying an electric field across the thin film. Alternatively, an ordered condition can be achieved by applying a mechanical shearing force to the substance, which force affects the orientation of the molecules in the manner desired. It is also considered helpful in constructing liquid crystal cells to appropriately treat the cell surfaces, e.g., in the manner described in the above-cited copending F. J. Kahn application to achieve a well ordered arrangement of the molecules as well as to maintain long-lasting scattering regions.

Disorder can be imposed in a liquid crystal by applying a conduction current to the liquid crystal substance which current is arranged to introduce turbulence into the substance. In other instances, disorder is introduced by applying heat sufficiently high to cause the material to make the transition from the liquid crystal state to the isotropic liquid state and then allowing the material to return to the mesophase. In this latter instance, when the substance is cooled to the liquid crystalline state, it retains the disturbed condition of the molecules caused by the heating effect. It is this heat-induced scattering which is adapted in a specialized manner in the present invention.

It is well to note that some liquid crystal materials exhibit more than one orientational order, each of which typically exists in a specified temperature range. Heating such a material so that it makes a transition from one such ordered condition to another and cooling the material to the temperature range of the first condition also induces a disturbed condition which is retained for a period of time.

In many liquid crystal materials the texture giving rise to scattering centers decays virtually spontaneously to a texture which does not scatter light. For example, in arrangements including nematic liquid crystal substances in which scattering centers are induced by means of conduction-current, a phenomenon more commonly referred to as dynamic scattering, light is scattered only so long as the flow of current is maintained. It has been found that the length of the decay interval of the scattering texture is a function of the type and composition of the material.

3. Prior Art

A number of prior art arrangements include means for "writing" on a liquid crystal cell by inducing light-scattering regions in otherwise clear liquid crystals. In particular, in a well-known arrangement, the cell includes a photoconductive layer, the impedance of which changes in relation to the intensity of light incident on it. During the writing mode, an electric potential is maintained across the liquid crystal substance and photoconductive layer of the cell. At the point of incidence of the light beam on the cell, the impedance of the photoconductive layer, and hence the voltage across it, decreases, thereby increasing the voltage drop across the liquid crystal. The resulting increase in voltage across the liquid crystal produces scattering areas within the liquid crystal. Such an arrangement is described, for example, in an article entitled, "Reversible Ultraviolet Imaging with Liquid Crystals" by J. D. Margerum et al, appearing in Applied Physics Letters, Vol. 17, pages 51–53, July 15, 1970. See also, G. H. Conners et al, U.S. Pat. No. 3,592,527, issued July 13, 1971.

In addition, it is well-known to use a laser beam as the light source to alter the resistance characteristics of the photoconductive layer. The typical configuration in which such cells containing a photoconductive layer, are used further includes a source of projection light for projecting an image on a display surface.

However, it is a characteristic of the mentioned photoconductive materials that they alter the optical characteristics of the system. In particular, these materials typically absorb a range of frequencies of the projection light shone on them, thus causing a degenerative effect on the projected image. Special precautions often involving expensive and intricate apparatus must therefore be used to avoid these degenerative effects. The precautionary measures often result in inefficient use of the projection light.

The prior art liquid crystal cells are generally of either the transmissive type, in which scattered projection light passes through the entire cell, or the reflection type, in which the projection light is reflected from an internal surface. The images projected in the prior art arrangements exhibiting the transmissive mode are typically characterized by dark writing on an orange or, at best, pale yellow background, depending on the substances used. Contrast is even more difficult to obtain, when the reflection mode is used primarily because of spurious reflection at the substrate surfaces. Further, it is difficult to fabricate reflecting layers which reflect a significant amount of projection light while, at the same time, providing efficient electrical conduction in a direction perpendicular to the plane of the reflecting layer, or, stated differently, minimizing undesirable current flow in the plane of the reflecting layer.

It is therefore an object of the present invention to provide a liquid crystal display system exhibiting a clear, easily readable, black-and white image.

It is a further object of the present invention to provide more versatile liquid crystal display cells useful in both transmissive and reflective mode arrangements.

It is a still further object of the present invention to provide a liquid crystal projection system which makes efficient use of projection light to display high-resolution images.

Other prior art arrangements, instead of inducing light-scattering regions in the liquid crystal substance, induce color changes in the substance. In particular, heat may be selectively applied to a heat-absorbing layer adjacent the liquid crystal substance. The liquid crystal thereby becomes heated and exhibits a color change which can be used to project a corresponding color image. However, the color changes thus produced disappear once the liquid crystal is cooled. One system in accordance with this prior art arrangement which utilizes liquid crystal layers is disclosed in J. L. Fergason et al, U.S. Pat. No. 3,114,836 issued Dec. 17, 1963.

In addition, thermally induced color changes in liquid crystal display cells incorporating encapsulated liquid crystal substances are described in D. Churchill et al, British Pat. No. 1,138,590, published Jan. 1, 1969.

Still further, it is known to transform entire liquid crystal cells, including cholesteric liquid crystal substances from transparent to translucent by thermally inducing scattering areas throughout the entire cell. See R. A. Soref, "Thermo-Optic Effects in Nematic-Cholesteric Mixtures," Journal of Applied Physics, June 1970, pages 3,022–3,026.

It is therefore an additional object of the present invention to provide liquid crystal display cells including high-density, high-resolution selectively thermally induced scattering regions.

In those prior art arrangements specifying color variation for forming the image, the image is maintained only so long as the heat is applied to the liquid crystal material. Further, the use of masks as in the above-cited Churchill et al arrangement limits, to a great extent, the addressing speed of the liquid crystal cell.

It is a further object of the present invention to provide display apparatus having relatively high-speed adressing arrangements.

It is a still further object of the present invention to provide a liquid crystal display system exhibiting selective retentivity of a color-free image for an extended period of time.

Another prior art patent, that issued to C. W. Kessler et al, U.S. Pat. No. 3,637,291, on Jan. 25, 1972, shows a liquid crystal display cell including encapsulated liquid crystal substances and an array of heating elements. The heating elements, arranged to be responsive to electrical impulses, produce color variations within the liquid crystal substances. The color variations are erased by means of an electrostatic field applied to the cell. The application of such electrostatic fields, in general, significantly lessens the useful life of liquid crystal cells.

It is therefore an object of the present invention to provide a liquid crystal display cell which is erasable by other than an electrostatic field and, hence, having a significantly longer, useful life.

SUMMARY OF THE PRESENT INVENTION

In accordance with the present invention, a liquid crystal display cell includes a layer of liquid crystal substance, transparent supporting substrates and means for heating selected areas of the liquid crystal substance beyond a transition temperature to produce long-lasting light-scattering regions and for erasing those light-scattering areas. In particular, selected areas of the liquid crystal substance are heated to a sufficiently high temperature to transform them from the mesophase to the isotropic liquid phase (or from a first phase in the mesophase to a second). The substance is then cooled from the isotropic liquid phase to the mesophase (or from the second phase in the mesophase to the first) to form long-lasting light-scattering areas. Once information is "written into" the liquid crystal cell in this fashion, it can be stored or, if desired, the cell can be erased, in whole or in part, by applying a suitable a-c voltage to the cell.

The present invention is useful in typical embodiment, as a display system, e.g., in a single-aperture schlieren optics projection system or in projection systems similar to those used to project the images of 35 mm photographic slides. As with these well-known systems, an arc lamp or an incandescent bulb provides a source of viewing or projection light and a conventional viewing screen provides a viewing medium. Well-known lens and aperture combinations provide magnification and focusing functions.

The arrangements of the present invention typically include an X-Y-deflected intensity-modulated laser beam for selectively inducing heat in liquid crystal cells.

The apparatus of the present invention also obviates the need for a photoconductive layer, thus avoiding the difficulties inherent in the fabrication of these photoconductive layers for use in liquid crystal display cells. Again, display systems incorporating the present invention produce true black-and-white images.

It is therefore a feature of the present invention that a liquid crystal display system for producing high-resolution, high-contrast, black-and-white images includes apparatus for addressing a liquid crystal cell by the selective application of heat thereto.

It is a further feature of the present invention that a liquid crystal cell is provided which includes a thin film of liquid crystal substance, and in which selected portions of this film are heated using a laser.

BRIEF DESCRIPTION OF THE DRAWING

FIGS. 2A and 2B show liquid crystal display cell for use in the projection system of the preferred embodiment of FIG. 1.

FIG. 3 shows a liquid crystal display cell in accordance with an alternate embodiment of the present invention.

FIGS. 4, 5 and 6 illustrate liquid crystal display cells in accordance with still other embodiments of the present invention.

DETAILED DESCRIPTION

The preferred embodiment of the present invention includes an infrared laser addressing arrangement and a liquid crystal cell operating in the transmission mode. The cell includes two erasing electrodes which also perform the mentioned heat-producing function. The above-cited copending application, Ser. No. 266,587, filed of even date herewith describes liquid crystal cells having properties which are particularly useful in the projection systems of the present invention. The matter disclosed in said F. J. Kahn application is hereby incorporated by reference into the present disclosures.

Figure 1:
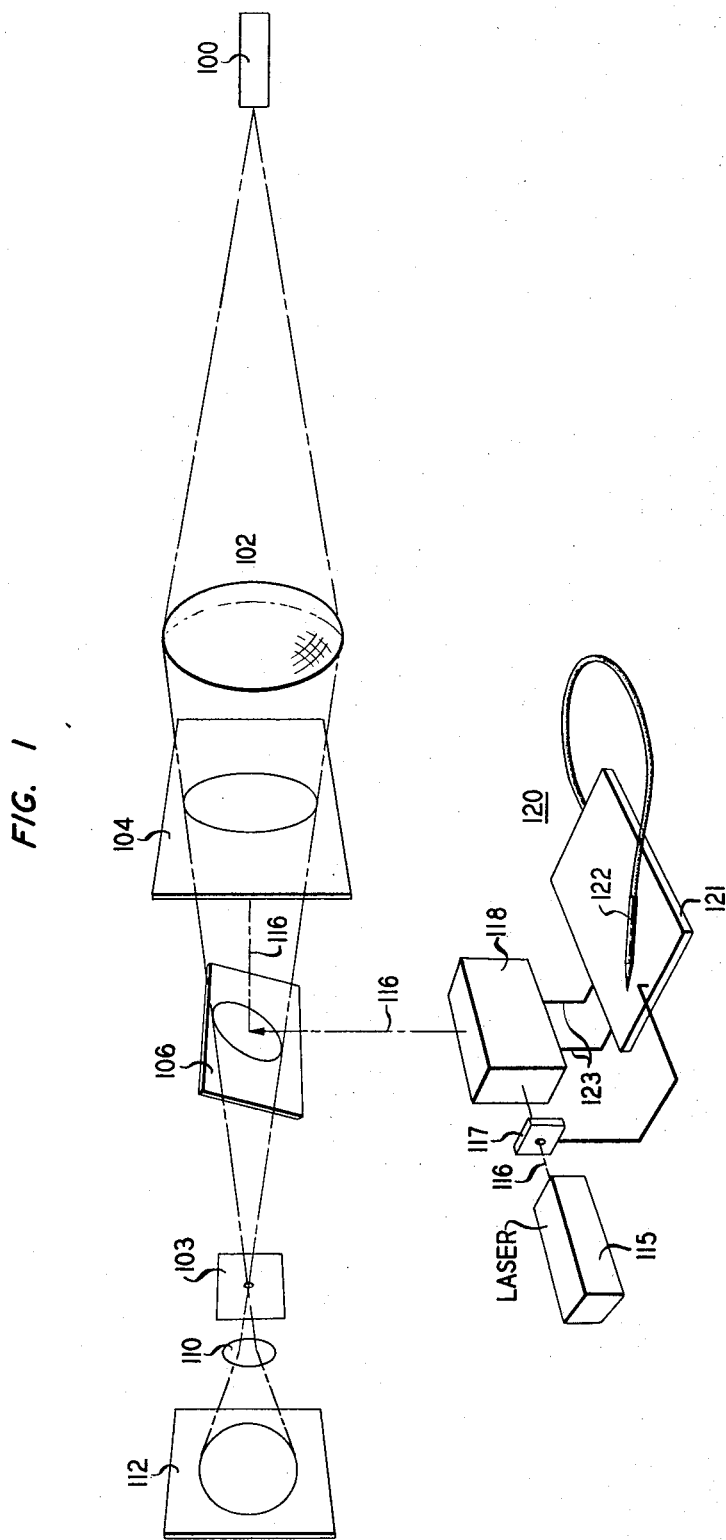
FIG. 1 shows a projection system in accordance with the preferred embodiment of the present invention.

FIG. 1 shows a projection system in accordance with the preferred embodiment of the present invention. In particular, a source of viewing light 100, illustratively, a 150-watt xenon arc lamp, emits light which is focused by lens 102 such that the light converges at aperture plate 103. Lens 110 is arranged to project the nonscattered light passed by aperture plate 103 onto screen 112.

Liquid crystal cell 104 is positioned between lens 102 and aperture plate 103 so that an image defined by the light-scattering regions on cell 104 will be projected onto screen 112. Cell 104, as mentioned, is a liquid crystal cell constructed to operate in the transmissive mode. Reflecting surface 106 is transparent to light from source 100. More will be said about this below.

FIG. 2A illustrates a liquid crystal cell for use in the projection arrangement of the present invention as shown in FIG. 1. The cell of FIG. 2A includes transparent support substrates 201 and 202 typically made of quartz, glass or any other suitable material. Adjacent these support substrates are electrodes 203 and 204, and sandwiched between electrodes 203 and 204 is a liquid crystal substance 205.

FIG. 2A depicts a typical cell in cross section. Spacers 206 and 208, which extend around the periphery of the cell form a cavity with the electrode-coated substrates 201 and 202 for containing the liquid crystal substance. The spacers 206 and 208 typically comprise Mylar, or similar material exhibiting low electrical conduction and high dielectric strength. Electrodes 203 and 204 are in close electrical and thermal contact with liquid crystal substance 205.

In preferred embodiments, such a cell includes two quartz support substrates (201, 202) with a layer of indium tin oxide, $In_{2-x}Sn_xO_{3-y}$, deposited on each substrate to form the heat-producing electrodes 203, 204. These indium tin oxide electrodes are sputter-deposited on the substrates 201, 202 which are maintained above 500 degrees Centigrade in an oxygen-deficient environment during sputtering, e.g., as described in the Abstract, entitled "Highly Conductive Transparent Films of Sputtered Indium Oxide-Tin Oxide" by D. B. Fraser et al, appearing in The Electrochemical Society Extended Abstracts, Washington, D.C., May 1971. Electrodes produced in this manner are of the order of 2,000 to 10,000 angstroms thick and exhibit good light transmission properties at visible wavelengths with little scattering. Further, the electrodes have a sufficiently high carrier density to absorb light by free-carrier absorption in the 0.8 to 1.6 $\mu m$ wavelength range. The liquid crystal substance sandwiched between the electrode-deposited surfaces of the quartz substrates is, for example, a cholesteric liquid crystal with a negative dielectric anisotropy, such as, a mixture of N-(p-Methoxy Benzylidene)-p Butylaniline (MBBA) with approximately 10 percent by weight of cholesteryl nonanoate.

In accordance with this preferred cell arrangement, coherent addressing light shone on the liquid crystal cell of FIG. 2A, and illustrated by the arrow designated "addressing light" in FIG. 2A, passes through the cell from left to right. It is understood that the terms "coherent light" and "laser light," used interchangeably throughout the instant application, mean a narrow beam of laser light. In particular, substrate 201 transmits essentially all of the incident light through it, as does substrate 202. A portion of the addressing beam is absorbed, however, by the heat-producing electrode layers 203 and 204. This absorbed radiation stimulates the electrode layers to produce heat. The heat thus generated is advantageously arranged to heat the liquid crystal material between the stimulated areas of the electrodes to a temperature sufficient to transform the liquid crystal substance from the mesophase to the isotropic liquid state. This transition temperature for the illustrative liquid crystal materials specified above is approximately 38° to 45° Centigrade. The addressing beam is then removed and the liquid crystal cooled to its mesophase, thus inducing a long-lasting light-scattering area in the liquid crystal.

In addition, a source of a-c voltage 207 is advantageously connected to heat-generating (erasing) electrodes 203 and 204 by means of switch 209. When switch 209 in FIG. 2A is closed, the voltage from source 207 is applied to those erasing layers. Specifically, an a-c voltage with a frequency higher than the relaxation frequency of the liquid crystal material applied across the liquid crystal substance removes any scattering areas between those electrodes. As is well-known in the art, the dielectric relaxation frequency is advantageously equal to $\sigma/2\pi D$, where $\sigma$ is the conductivity in (ohm-centimeters)$^{-1}$ of the liquid crystal substance, $D = \epsilon\epsilon_o$, $\epsilon$ is the dielectric constant of the liquid crystal substance and $\epsilon_o = 8.86 \times 10^{14}$ farad/centimeter, the dielectric constant of free space. Illustratively, an erasing voltage having a magnitude of the order of 50 to 150 V peak-to-peak and a frequency of the order of 0.5 to 8 kHz is convenient to erase the scattering centers of a layer of the above-mentioned MBBA substance of the order of 6 to 30 $\mu m$ thick.

As mentioned above, uniformly ordered crystals in the mesophase scatter little or no light in the absence of addressing stimuli.

A number of liquid crystal substances having well-ordered mesophases occur naturally. Alternatively, an ordered condition of the molecules can be imposed on a substance having a disordered mesophase by appropriate treatment of the substrate surfaces or electrodes. (See, for example, the above-cited copending application by F. J. Kahn filed of even date herewith and incorporated by reference in this application.)

Once a well-ordered condition has been established in the liquid crystal substance, light-scattering regions are introduced by disordering molecules or groups of molecules with respect to each other in those regions. By application of an appropriate erase voltage, these scattering areas can be reordered again to transmit light without scattering.

For example, if an erase voltage between the electrodes 203 and 204 is to erase light-scattering regions in a liquid crystal mesophase with a negative dielectric anisotropy, in the ordered state of this material the long axes of the molecules are preferably aligned in directions parallel to the surfaces of the electrodes. As a further example, in a liquid crystal material with positive dielectric anisotropy, an erase voltage between electrodes 203 and 204 erases light-scattering regions if the molecules in the ordered mesophase are aligned with their long axes of the molecules directed substantially perpendicular to the large surfaces of the electrodes 203 and 204.

Referring again to FIG. 1, it should be noted that a laser addressing arrangement is included. In accordance with this arrangement, a source of laser radiation 115 produces a beam of coherent laser light. In particular, laser source 115 is arranged to generate a beam of laser radiation designated 116 in FIG. 1.

Before continuing with the discussion of the overall arrangement of FIG. 1, it is well to consider typical laser sources suitable for use in the arrangement of FIG. 1. Thus, consider a cell such as that shown in FIG. 2A, comprising quartz substrates, indium tin oxide electrodes and a layer of MBBA with 10 percent by weight of cholesteryl nonanoate (CN) liquid crystal. The indium tin oxide is transparent to visible (projection) light and absorbs laser light in the infrared region, specifically, light of a wavelength in the range from 0.8 $\mu m$ to 1.3 $\mu m$. Hence, a gallium arsenide (GaAs) laser source, emitting light of a wavelength 0.9 $\mu m$, an yttrium aluminum garnet (YAG) laser source (1.06 $\mu m$) or the 1.15 $\mu m$ emission line of a helium neon (HeNe) laser are all suitable for addressing such a cell.

In addition, since indium tin oxide absorbs light in the ultraviolet range, ultraviolet laser sources such as a helium cadmium source emitting light having a wavelength of 0.325 $\mu m$ or a krypton laser source emitting light having a wavelength of 0.35 $\mu m$ are also suitable for use in the arrangement of FIG. 1.

The laser beam 116 is, in this typical embodiment, controlled in standard fashion by shutter 117 which is arranged to either essentially completely stop or transmit the laser beam. If shutter 117 is "open" such that it transmits laser beam 116, the beam is further controlled by control apparatus 118. Control apparatus 118 includes apparatus, e.g., movable mirrors, for redirecting the laser beam to intersect reflecting surface 106. (Reflecting surface 106, in this arrangement, is a dichroic mirror which reflects laser light but transmits viewing light.)

Clearly, from FIG. 1, it is apparent that the point of incidence of laser beam 116 on inclined reflecting surface 106 determines the point on liquid crystal cell 104 to be intersected by and, hence, addressed by laser beam 116. Thus, by changing the angle of deflection of the mirrors of control apparatus 118, for example, any point on the image area of liquid crystal cell 104 can be addressed by laser beam 116. Further, by continuously changing the angle of deflection of the control mirrors, the laser beam can be continuously moved about the image area of cell 104. In a typical arrangement, the laser beam 116 is arranged to reproduce rapidly applied handwriting on the display cell image area.

Toward this end, FIG. 1 also includes an electronic writing graphics input arrangement 120. Such graphics input writing arrangements exist in a number of forms (e.g., the well-known RAND tablet) and in varying degrees of sophistication in the prior art. For example, for purposes of discussion, consider a typical arrangement comprising a writing pad such as pad 121 of FIG. 1 including electrical position-specifying sensors. Pen 122, in turn, includes means for stimulating the position-specifying sensors of pad 121. As pen 122 is, in a typical arrangement, touched to the surface of pad 121, a signal unique to the position on the pad of pen 122 is generated. In the arrangement shown in FIG. 1, the position signals generated by arrangement 120 are conveyed to control apparatus 118 via leads 123. Control apparatus 118 includes circuitry and other well-known apparatus for controlling the laser-beam redirecting apparatus in response to the position-specifying signals received from graphics apparatus 120. In addition, indication signals are communicated from graphics unit 120 to shutter 117 which are arranged to, in one instance, close and hence block laser beam 116 when pen 122 is not in contact with the surface of pad 121 and to open and transmit the addressing beam when pen 122 is in contact with pad 121.

From the foregoing discussion, it is evident that, in accordance with the arrangement of FIG. 1, information, such as a signature, can be written on pad 121 (which, incidentally, typically includes paper placed on the surface of pad 121 and ink depositing means within pen 122 to provide a visual aid to the operator). Laser beam 116, controlled by graphics unit 120, shutter 117, control means 118 and reflecting surface 106, accurately transcribe the signature written on pad 121 onto liquid crystal cell 104 by means of the heat-stimulated scattering area generation.

At the same time, if viewing light 100 is on, the information transcribed onto cell 104 is simultaneously projected on screen 112. As mentioned, reflecting surface 106 is transparent to viewing light. In addition, aperture plate 103 blocks scattered light (that is, light scattered by the light-scattering regions of the liquid crystal cell), rendering the addressing information black on a white background. Clearly, a stop could be used to block the nonscattered light to produce white "writing" on a black background.

Of course, it is understood that the liquid crystal cell must be maintained within the temperature range defining the mesophase for the liquid crystal substance chosen (except those regions being addressed, of course). This may be accomplished by judicious choice of a source of projection light which can also uniformly heat the liquid crystal cell or by external heating apparatus. The manner in which this is accomplished is well within the skill of the ordinary worker in the art.

The cell of FIG. 2A, suggested as a typical cell useful in the display arrangement of FIG. 1, illustrates a transmission mode cell in which the electrodes 203, 204 which are transparent to viewing light not only perform the erasing function but absorb addressing light to produce heated areas. These heated areas, in turn, are arranged to induce scattering centers of light in a layer of liquid crystal substance.

FIG. 2B illustrates a cell including electrodes 212, 213 which perform the erasing function only. (The voltage source and switch have been omitted from FIG. 2B for convenience.) In addition, the cell of FIG. 2B includes heat-producing layers 210, 211 which absorb addressing light and produce heat in response thereto. The electrodes 212 and 213 are arranged to efficiently conduct heat from the heat-producing layers 210 and 211 to the liquid crystal layer 205. In a typical embodiment, the layers 210 and 211 are composed of pale yellow zinc cadmium sulfide. The source of laser radiation, in this embodiment, is a helium cadmium laser which emits light at a wavelength of 0.4416 $\mu$m which is advantageously absorbed by the zinc cadmium sulfide, $Zn_xCd_{1-x}S$.

Although the above detailed description has proceeded in terms of a transmission cell, it is often desirable to provide liquid crystal projection systems which include a reflection mode cell. FIG. 3 shows a liquid crystal reflection mode display cell in accordance with the present invention.

In particular, the cell of FIG. 3, like the transmission mode cell of FIG. 2, includes transparent substrates 301, 302 (typically quartz or glass), spacers 306 and 308 (typically Mylar), and a liquid crystal substance 305 (typically MBBA with 10 percent by weight of cholesterol nonanoate), a source of a-c potential 307 and a switch 309. In addition, the cell of FIG. 3 also includes a heat-producing layer 310, for example, carbon black or cermet, and an electrode 304 that reflects viewing light, comprising, for example, aluminum. The layer 310 and the electrode 304 are arranged to be in close thermal contact with the liquid crystal substance 305. A second visually transparent electrode, 303, typically indium tin oxide or tin oxide, deposited on substrate 302 is also provided. The electrodes 303 and 304 are connected to source 307 via switch 309, as shown.

In accordance with the arrangement of FIG. 3, addressing light from, say, the 6328 angstrom emission line of a HeNe laser is focused on the cell. Light-absorbing layer 310 absorbs the selectively applied addressing light to produce local "hot spots" which heat adjacent portions of the enclosed liquid crystal substance sufficiently to raise the temperature of the liquid crystal substance beyond its transition temperature. The addressing beam is then removed and the liquid crystal cooled to its mesophase thereby to induce long-lasting scattering centers in the liquid crystal.

As discussed with respect to the cell of FIG. 2A, light-scattering centers in the reflection-mode cell are erased by closing the switch 309 thereby applying an a-c voltage from source 307 (of a magnitude and frequency similar to that for the cell of FIG. 2A) to the electrodes 303 and 304.

Since the reflection mode cell of FIG. 3 does not transmit viewing light, the projection system of FIG. 1 is not appropriate for use with that cell. However, it is a simple matter to arrange the source of viewing light, projection screen, aperture plate (or stop) and focusing lens to correctly project the reflected viewing light.

FIG. 4 shows a reflecting mode cell similar to that of FIG. 3 but modified to eliminate the deleterious effects of the "side spreading" of heat conducted from the heat-absorbing layer to the liquid crystal substance in the reflection layer. (In FIGS. 3 and 4, like numerals refer to like elements.) In particular, the reflecting electrode 304 in FIG. 3 is replaced by a plurality of reflecting elements 404 in FIG. 4. Although for simplicity only one of the elements 404 bears the explicit identification numeral, each of the column of elements should be considered to be so identified. Further subdivision of the elements in the direction perpendicular to the page of the drawing proves advantageous. These reflecting elements (which may illustratively be the shape of right circular cylinders) are individual light reflectors for reflecting projection light. The isolation between the elements 404 prevents the conduction of heat from one reflecting element 404 to another. FIG. 4 also shows a separate erasing electrode, 403, for erasing scattering centers of light introduced by means of the addressing beam.

In addition, it is often required in display systems, such as those used in the projection of handwriting on a projection surface, to provide a selective erase facility. The liquid crystal display cell, as shown in FIG. 4, for example, can be arranged to provide such a facility. Specifically, the heat-generating layer 310 in one embodiment, comprises a photosensitive material. The photosensitive material then performs a dual function. As in the cells of FIGS. 3 and 4, under certain conditions heat-generating layer 310 is arranged to absorb addressing light to produce hot spots which induce light-scattering centers in liquid crystal substance 305. In addition, however, the photosensitive material is arranged under different conditions, to erase the scattering centers within the liquid crystal substance.

During the writing phase, the photosensitive layer 310 absorbs addressing light to produce heated regions which heat the nearby areas of the liquid crystal substance 305 beyond its transition temperature. (No voltage is typically applied to electrodes 303 and 403 during the writing phase.)

During the overall erase phase, a suitable voltage is applied to electrodes 303 and 403 to remove all light-scattering regions within the liquid crystal cell.

During the selective erase phase, a voltage is maintained across electrodes 303 and 403 which is insufficient to erase the scattering centers of light within the cell. In addition, the addressing light is arranged to have a wavelength close to the sensitivity peak of the photosensitive material of layer 310. The incidence of addressing light of the mentioned wavelength stimulates photocarriers in the selectively exposed areas of the photosensitive material which, in turn, causes the voltage drop across layer 310 to decrease. Hence, the voltage drop across the liquid crystal substance increases. The increased voltage drop across the liquid crystal substance, resulting from the incidence of addressing light on the cell, is arranged to be sufficiently high to erase the light-scattering centers within the liquid crystal. This arrangement, then, allows the precise erasure of portions of information stored in the liquid crystal cell. Consider, for example, the convenience of simply selectively overwriting characters or figures on pad 121 with pen 122 in FIG. 1 (assuming appropriate alterations to facilitate the use of a reflection cell), thereby to erase only those characters or figures.

Figure 5:
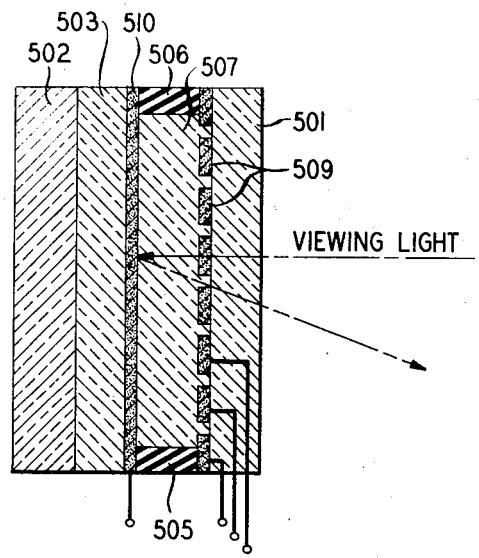

An alternate arrangement for selectively erasing portions of the liquid crystal cell includes a matrix of electrodes and is illustrated in FIG. 5. In accordance with the reflection mode cell arrangement of FIG. 5, transparent substrates 501 and 502, a light-absorbing/heat-generating layer 503, spacers 505 and 506, and liquid crystal substance 507 are provided. The arrangement of FIG. 5, however, includes strips of erasing electrodes in place of the layers of electrodes of the foregoing illustrative arrangements. In particular, a number of visually transparent electrodes, 509, in FIG. 5, are arranged in parallel strips on substrate 501. For convenience, only two of these electrodes have been designated with the numeral 509. It is understood, however, that the designation applies to the other like elements as well. In addition, another set of light-reflecting electrodes 510 is arranged in strips having their long axes perpendicular to those of electrodes 509 on heat-generating layer 503. Only a side view of one of the electrodes 510 is shown in FIG. 5. All of the electrodes 509 and 510 have individual voltage terminals. By simultaneously applying a voltage to one of the electrodes 509 and one of the electrodes 510, a voltage is established in the region between the two electrodes sufficient to erase any scattering centers therebetween.

Figure 6:
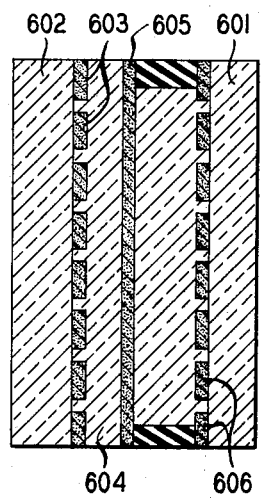

FIG. 6 illustrates a reflection mode cell thermally addressed in accordance with another embodiment of the instant invention. The cell of FIG. 6 includes substrates 601, 602. Substrate 601 in this reflection mode cell must be transparent to the projection light. A number of strip-like writing electrodes 603 (only two of which bear the actual designation, for simplicity) are positioned on substrate 602 as shown. In addition, resistive layer 604 is applied to the substrate 602 and the strip electrodes 603. This resistive layer might illustratively comprise polycrystalline silicon. Further, a number of erase electrodes 606 having a shape and orientation like those of electrodes 603 are positioned on substrate 601. Still further, a number of electrodes 605, also strips, are arranged on resistive layer 604 such that the long axes of electrodes 605 are perpendicular to the long axes of electrodes 603 and 605. A side view of only one of the strips 605 is shown in FIG. 6. Electrodes 605 which are typically 5 to 300 $\mu$m wide are arranged to reflect viewing light.

During the writing phase, a voltage is applied to selected ones of the electrodes 603 and 605. The region within resistive layer 604 between the activated electrodes increases in temperature in response to the applied voltage. The increased concentration of heat in the resistive layer is conducted to the liquid crystal cell where it induces the formation of light-scattering regions.

During the erasing phase, a suitable erase voltage is concurrently applied to selected ones of the electrodes 605 and 606. By appropriately selecting the algebraic sum of the voltages applied to the selected electrodes 605 and 606, the path comprising the liquid crystal substance between the energized electrodes is subjected to an erasing voltage.

A transmission mode cell like the reflection mode cell of FIG. 6 can include a transparent resistive layer. Suitable materials for such a layer are zinc sulfide, zinc oxide and zinc cadmium sulfide which are highly resistive to current flow at low voltages while permitting high current flow at high voltages and which do not exhibit photosensitivity to visible light.

Figure 7:
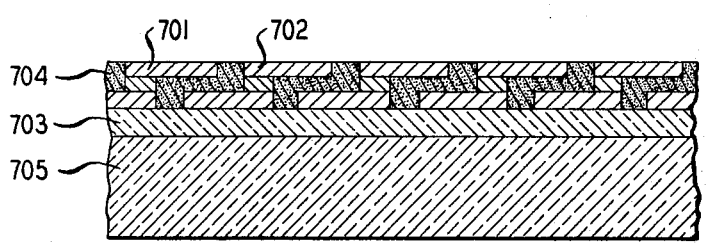
FIG. 7 illustrates a liquid crystal display cell arrangement modified to more efficiently reflect viewing light.

A number of alternate arrangements of the present invention include reflecting strips or elements which are physically displaced from each other. These arrangements can be wasteful of viewing light since the gaps between elements or strips typically do not reflect light. More efficient use of viewing light is obtained in arrangements such as that shown in FIG. 7. In accordance with this arrangement, adjacent reflecting elements, for example, electrodes 701 and 702 (shown in side view only) isolated from each other thereby preserving electrical integrity, as required. The elements or strips of FIG. 7 are modified somewhat to provide an overlap for reflecting purposes only. In particular, the strip electrode 701 of FIG. 7 includes a section contiguous to heat-absorbing layer 703, a section adjacent the other surface of insulator 704 and a conducting connector section, all imbedded within insulator 704. In a typical cell, the heat-absorbing layer is affixed to one of the support substrates of a display cell.

The present invention has been described with particular attention to a number of alternate embodiments. It is understood that these embodiments are illustrative only and that various modifications and alterations to them within the spirit and scope of the present invention will occur to those of ordinary skill in the art. For example, a number of embodiments have illustrated the so-called reflective mode cell. It is apparent that the principles and techniques relating to transmissive mode cells are applicable also to reflective mode cells with suitable modifications, such as, replacing a layer arranged to reflect viewing light with one transparent to viewing light, and vice versa.

What is claimed is:

1. A display system including
a. a liquid crystal display cell comprising a layer of liquid crystal substance and two transparent support substrates for containing said layer of liquid crystal substance, said liquid crystal substance being arranged to exhibit differing light-scattering properties in response to thermal excitation,
b. projection means including a source of projection light for projecting an image stored in said liquid crystal substance onto a viewing surface, and
c. means for controllably heating selected areas of said liquid crystal substance above the transition temperature of said liquid crystal substance, said means for heating comprising means for selectively applying laser light to said liquid crystal substance, wherein said liquid crystal display cell further includes a first layer of electrically conducting material between one of said transparent support substrates and said liquid crystal substance and a second layer of electrically conducting material transparent to viewing light between the other of said transparent support substrates and said liquid crystal substance, and means for controllably applying high-frequency electrical signals to said layers of conducting material, and wherein at least one of said layers of conducting material is an absorbing electrode for absorbing a portion of said laser light to produce a heated region in response thereto which is sufficiently high in temperature to raise the temperature of said liquid crystal substance above the transition temperature of said liquid crystal substance, and wherein each of said absorbing electrodes comprises indium tin oxide including excess carriers sufficient to establish free carrier absorption of light having a wavelength in the range 0.8 $\mu$m to 1.6 $\mu$m and said means for applying laser light comprises apparatus for emitting light having a wavelength in the range 0.8 $\mu$m to 1.6 $\mu$m.

2. Apparatus as in claim 1 wherein said layer of liquid crystal substance comprises a cholesteric liquid crystal substance having negative dielectric anisotropy and in which the molecules in the ordered state are arranged to have the long axes thereof aligned in a direction parallel to the surface of the conducting electrodes.

3. Apparatus as in claim 2 wherein said cholesteric liquid crystal substance is a solution of MBBA including 10 percent by weight solution of CN and 2 percent by weight of Butyl Aniline.

4. Apparatus as in claim 3 wherein said means for applying coherent light comprises a GaAs laser source for emitting coherent light having a wavelength 0.9 $\mu$m.

5. Apparatus as in claim 3 wherein said means for applying coherent light comprises a YAG laser source for emitting coherent light having a wavelength 1.06 $\mu$m.

6. Apparatus as in claim 3 wherein said means for applying coherent light comprises a HeNe laser source for emitting coherent light having a wavelength 1.15 $\mu$m.

7. Apparatus as in claim 3 wherein said means for applying coherent light comprises a gallium aluminum arsenide source for emitting light having a wavelength in the range 0.8 $\mu$m to 0.9 $\mu$m.

8. A display system including
a. a liquid crystal display cell comprising a layer of liquid crystal substance and two transparent support substrates for containing said layer of liquid crystal substance, said liquid crystal substance being arranged to exhibit differing light-scattering properties in response to thermal excitation,
b. projection means including a source of projection light for projecting an image stored in said liquid crystal substance onto a viewing surface, and
c. means for controllably heating selected areas of said liquid crystal substance above the transition temperature of said liquid crystal substance, said means for heating comprising means for selectively applying laser light to said liquid crystal substance, wherein said display cell futher comprises
i. a layer of heat-producing material adjacent a first one of said transparent electrodes for transforming light from said source of addressing light into heated regions in said heat-producing material,
ii. a first erasing electrode layer intermediate said layer of heat-producing material and said liquid crystal substance, said first erasing electrode layer being arranged to reflect projection light and to conduct heat to said liquid crystal substance, and
iii. a second erasing electrode layer intermediate the second one of said support substrates and said liquid crystal substance said second erasing electrode being transparent to light from said source of viewing light.

9. Apparatus as in claim 8 further including a source of high frequency electrical signals and means for controllably applying said signals to said erasing electrode layers.

10. A cell as in claim 9 wherein said isolating material comprises an electrical insulating substance, and wherein each of said first and second plurality of light-reflecting elements further comprises means for establishing thermal and electrical conduction paths among selected ones of their respective reflecting elements.

11. A display system including
 a. a liquid crystal display cell comprising a layer of liquid crystal substance and two transparent support substrates for containing said layer of liquid crystal substance, said liquid crystal substance being arranged to exhibit differing light-scattering properties in response to thermal excitation,
 b. projection means including a source of projection light for projecting an image stored in said liquid crystal substance onto a viewing surface, and
 c. means for controllably heating selected areas of said liquid crystal substance above the transition temperature of said liquid crystal substance, said means for heating comprising means for selectively applying laser light to said liquid crystal substance, and wherein said display cell further includes
  i. a first current-carrying layer contiguous to and coextensive with one of said transparent substrates, said first current-carrying layer being transparent to light from said source of addressing light,
  ii. a heat-producing layer adjacent and coextensive with said first current-carrying layer for transforming coherent light incident on said heat-producing layer into thermal energy,
  iii. a plurality of spatially separated reflectors adjacent said heat-producing layers for reflecting said projection light,
  iv. a second current-carrying layer contiguous to and coextensive with the other one of said transparent support substrates, said second current-carrying layer being transparent to light from said source of projection light and
  v. a source of high-frequency alternating voltage controllably connected to said first and second current-carrying electrode layers.

12. A display system including
 a. a liquid crystal display cell comprising a layer of liquid crystal substance and two transparent support substrates for containing said layer of liquid crystal substance, said liquid crystal substance being arranged to exhibit differing light-scattering properties in response to thermal excitation,
 b. projection means including a source of projection light for projecting an image stored in said liquid crystal substance onto a viewing surface, and
 c. means for controllably heating selected areas of said liquid crystal substance above the transition temperature of said liquid crystal substance, said means for heating comprising means for selectively applying laser light to said liquid crystal substance, and wherein said display cell further includes
  i. a first layer of current-carrying material contiguous to and coextensive with one of said transparent support substrates, said first layer of current-carrying material being transparent to light from said means for applying coherent light,
  ii. a layer of photosensitive material contiguous to and coextensive with said first layer of current-carrying material, said layer of photosensitive material being arranged to transform said coherent light within a range of power levels sufficient to raise the temperature of said liquid crystal substance beyond its transition temperature and to conduct increased current in response to said coherent light within a second range of power levels,
  iii. means intermediate said photosensitive layer and said liquid crystal substance for reflecting said projection light,
  iv. a second layer of current-carrying material contiguous to and coextensive with said second support substrate and said liquid crystal substance, said second current-carrying material being transparent to light from said projection means, and
  v. means for applying an electric potential between said first and second current-carrying layers sufficient to affect light-scattering centers within said liquid crystal substance only when addressing light within said second range of power levels irradiates said photosensitive material.

13. A display system including a liquid crystal display cell comprising
 a. a layer of liquid crystal substance arranged to scatter light within a specified range of wavelengths in response to thermal excitation,
 b. first and second support substrates for containing said layer of liquid crystal substance,
 c. a first plurality of current-carrying elements adjacent one of said transparent support substrates and a second plurality of current-carrying elements adjacent said second support substrate and intermediate said second support substrate and said liquid crystal substance,
 d. a layer of heat generating substance adjacent said first support substrate and contiguous said first plurality of current-carrying elements, for producing heat from electrical energy,
 e. a third plurality of current-carrying elements adjacent said heat generating layer and intermediate said heat generating layer and said liquid crystal substance,
 f. means for applying electrical energy to selected ones of said first and third current-carrying elements, said electrical energy being arranged to induce said heat generating substance to produce heat sufficiently high to cause scattering centers of light in said liquid crystal substance, and
 g. means for applying electrical signals to selected ones of said second and third pluralities of current-carrying elements to remove scattering centers of light from said liquid crystal substance, and projection means for generating a representation of differences in the scattering of light by said liquid crystal substance.

14. In a reflection mode liquid crystal display cell comprising a layer of liquid crystal substance, at least two support substrates for containing said liquid crystal substance, light-reflecting means positioned between said liquid crystal layer and one of said substrates, the improvement comprising
 a. a first plurality of spatially separated light-reflecting elements contiguous to one of said substrates for reflecting applied viewing light, b. a layer of transparent isolating material adjacent said first plurality of reflecting elements for imbedding said first plurality of elements, and
c. a second plurality of light-reflecting elements adjacent said layer of isolating material and separated from said first plurality of elements by said isolating material said first plurality of elements being positioned relative to said second plurality of reflecting elements such that said light-reflecting means reflects light from substantially all points incident on the face thereof.

15. A cell as in claim 14 wherein said layer of transparent isolating material comprises a heat-resistant substance.

16. A display system including
a. a liquid crystal display cell comprising a layer of liquid crystal substance and two transparent support substrates for containing said layer of liquid crystal substance, said liquid crystal substance being arranged to exhibit differing light-scattering properties in response to thermal excitation,
b. projection means including a source of projection light for projecting an image stored in said liquid crystal substance onto a viewing surface, and
c. means for controllably heating selected areas of said liquid crystal substance above the transition temperature of said liquid crystal substance, said means for heating comprising means for selectively applying laser light to said liquid crystal substance, wherein said liquid crystal display cell further includes a first layer of electrically conducting material between one of said transparent support substrates and said liquid crystal substance and a second layer of electrically conducting material transparent to viewing light between the other of said transparent support substrates and said liquid crystal substance, and means for controllably applying high-frequency electrical signals to said layers of conducting material, and wherein at least one of said layers of conducting material is an absorbing electrode for absorbing a portion of said laser light to produce a heated region in response thereto which is sufficiently high in temperature to raise the temperature of said liquid crystal substance above the transition temperature of said liquid crystal substance and wherein each of said absorbing electrodes comprises material for absorbing laser light in the ultraviolet range.

17. Apparatus as in claim 16 wherein said material comprises indium tin oxide for absorbing light from a helium cadmium laser source emitting light having a wavelength of 0.325 $\mu$m.

18. Apparatus as in claim 16 wherein said material comprises indium tin oxide for absorbing light from a krypton laser source emitting light having a wavelength of 0.35 $\mu$m.

* * * * *

UNITED STATES PATENT OFFICE
CERTIFICATE OF CORRECTION

PATENT NO. : 3,836,243
DATED : September 17, 1974
INVENTOR(S) : Hans Melchior

It is certified that error appears in the above-identified patent and that said Letters Patent are hereby corrected as shown below:

In column 16, claim 14, line 63, delete "the"; line 64, change "improvement comprising" to --wherein said light-reflecting means comprises--.

Signed and Sealed this twenty-first Day of October 1975

[SEAL]

Attest:

RUTH C. MASON
Attesting Officer

C. MARSHALL DANN
Commissioner of Patents and Trademarks